US006523676B2

(12) United States Patent
Nakatsukasa et al.

(10) Patent No.: US 6,523,676 B2
(45) Date of Patent: Feb. 25, 2003

(54) CONTINUOUS TREATMENT APPARATUS

(75) Inventors: Eiji Nakatsukasa, Kyoto (JP); Kanji Mikami, Shiga (JP); Katsutoshi Kamoto, Kyoto (JP)

(73) Assignee: Shimadzu Mectem, Inc., Otsu (JP)

( * ) Notice: Subject to any disclaimer, the term of this patent is extended or adjusted under 35 U.S.C. 154(b) by 0 days.

(21) Appl. No.: 09/770,389

(22) Filed: Jan. 29, 2001

(65) Prior Publication Data

US 2001/0050212 A1 Dec. 13, 2001

(30) Foreign Application Priority Data

Feb. 10, 2000 (JP) ....................................... 2000-033657

(51) Int. Cl.[7] ................................................ B65G 25/00
(52) U.S. Cl. .................. 198/737; 198/465.1; 198/468.9
(58) Field of Search ............................. 198/465.1, 737, 198/747, 468.9, 468.01

(56) References Cited

U.S. PATENT DOCUMENTS

| | | | | | |
|---|---|---|---|---|---|
| 19,523 | A | * | 3/1858 | Van Dorn | 198/747 |
| 724,831 | A | * | 4/1903 | Evanas | 198/741 |
| 2,668,614 | A | * | 2/1954 | Lawson | 198/697 |
| 4,279,337 | A | * | 7/1981 | Kachnik | 104/165 |
| 4,901,412 | A | * | 2/1990 | Jones | 198/465.1 |
| 6,170,634 | B1 | * | 1/2001 | Jaquet | 198/347.1 |
| 6,321,898 | B1 | * | 11/2001 | Inoue et al. | 198/346.1 |

FOREIGN PATENT DOCUMENTS

| | | |
|---|---|---|
| JP | 5-43955 | 7/1993 |
| JP | 6-297198 A | 10/1994 |

* cited by examiner

*Primary Examiner*—Christopher P. Ellis
*Assistant Examiner*—Richard Ridley
(74) *Attorney, Agent, or Firm*—Armstrong, Westerman & Hattori, LLP

(57) ABSTRACT

A continuous treatment apparatus is provided that resists thermal shock and treatment gases and correctly transfers treated objects. An urging mechanism 9 that urges a treated object w is adapted to transfer a treated object w by reciprocating rack member 91 using a pinion 92 in separating compartments 6 between treatment chambers 1, 2, 3, and 4. This arrangement eliminates the need to install rack members 91 and pinion 92 in a severe atomsphere.

11 Claims, 8 Drawing Sheets

CONTINUOUS TREATMENT APPARATUS

FIELD OF THE INVENTION

The present invention relates to a continuous treatment apparatus that offers several features that make it ideal for various treatments, including vacuum dewaxing, sintering, quenching, powdering, brazing, welding, coating, surface treatment, heat treatment and hot pressing, etc.

BACKGROUND OF THE INVENTION AND RELATED ART STATEMENT

A continuous treatment apparatus is designed to pass an object to be treated through a plurality of treatment chambers to apply a predetermined treatment to the object in a sequence of steps. A pusher chain type transfer apparatus adapted to drive a chain using sprockets is commonly used to transfer an object to be treated from one treatment chamber to another.

However, because the ends of the chain of a transfer apparatus of this type are moved forward to a position at which the chain passes through treatment chambers, part of the pusher chain is exposed to hot treatment gases at the position, so that the chain is liable to be adversely affected by thermal shock, treatment gas, etc. The sprockets are also adversely affected by thermal shock, treatment gas, etc. because they are disposed in the treatment chambers. The longer a treated object, the farther the pusher chain is moved forward. Accordingly, transfer performance tends to degrade. These problems can easily lead to shorter apparatus life, frequent maintenance requirements, and impaired reliability.

SUMMARY OF THE INVENTION

To solve the above-described problems, the present invention provides a continuous treatment apparatus adapted so that a treated object can be transferred from a treatment chamber to the next treatment chamber using urging mechanisms between a plurality of treatment chambers, wherein the urging mechanisms have the rack members that can move in the direction of transfer, a pinion which drives the rack members and latching means for selectively engaging the rack members with the treated object, and wherein the rack members are not only engaged or disengaged with the treated object using the latching means, but reciprocated between adjacent treatment chambers through the pinion to transfer the treated object from one treatment chamber to another.

Because the urging mechanism transfers a treated object by reciprocating rack members between the treatment chambers, the rack members and pinion do not need to be installed in the treatment chambers. Thus, rack members and pinion are less likely to be exposed to hot treatment gas, reducing the likelihood of damage resulting from thermal shock and exposure to treatment gas and ensuring stable operation for extended periods. Urging even a long treated object a plurality of times, with the latching means engaged with the object at a different position, allows efficient transfer of the object without large rack members.

In the above structure of the present invention, the rack members are provided in pair and a pinion is engaged with the rack members at the same time and the following operation is repeated: while one of the rack members moves forward to transfer a treated object, the other moves back in preparation for the next transfer, and vice versa.

It is preferable that the latching means of the present invention is provided at a plurality of positions along the direction of transfer of a treated object by the rack members in the above structure.

And also it is preferable that the latching means of the present invention is engaged with a treated object at a plurality of positions along the direction of transfer of the treated object.

To make closing the treatment chambers compatible with proper transfer of a treated object without preventing the mechanisms from interfering with each other, it is preferable that each treatment chamber be opened or closed by a lid, that rack members move along the transfer rail, which links adjacent treatment chambers with the lids open, and that it is possible to perform the following opposite operations around the shaft: (1) when the lid is opened, it is withdrawn to a position at which it does not interfere with the transfer rail or rack members; and (2) when the lid is closed, the transfer rail and rack members are withdrawn to a position at which the rail and rack members do not interfere with the lid.

It is desirable that the lid, the transfer rail, and the rack members of the present invention are installed and withdrawn using a common rotating shaft.

A rod of the present invention is preferred to be housed in the rotating shaft, and the rod ascends or descends to open or close the lid.

In the present invention, it is suitable that a pinion is connected with the rod, and the rod can be rotated without being prevented from ascending and desceding.

DESCRIPTION OF THE PREFERRED EMBODIMENTS

Referring now to the attached drawings, an embodiment of the present invention is described below.

Figure 1:
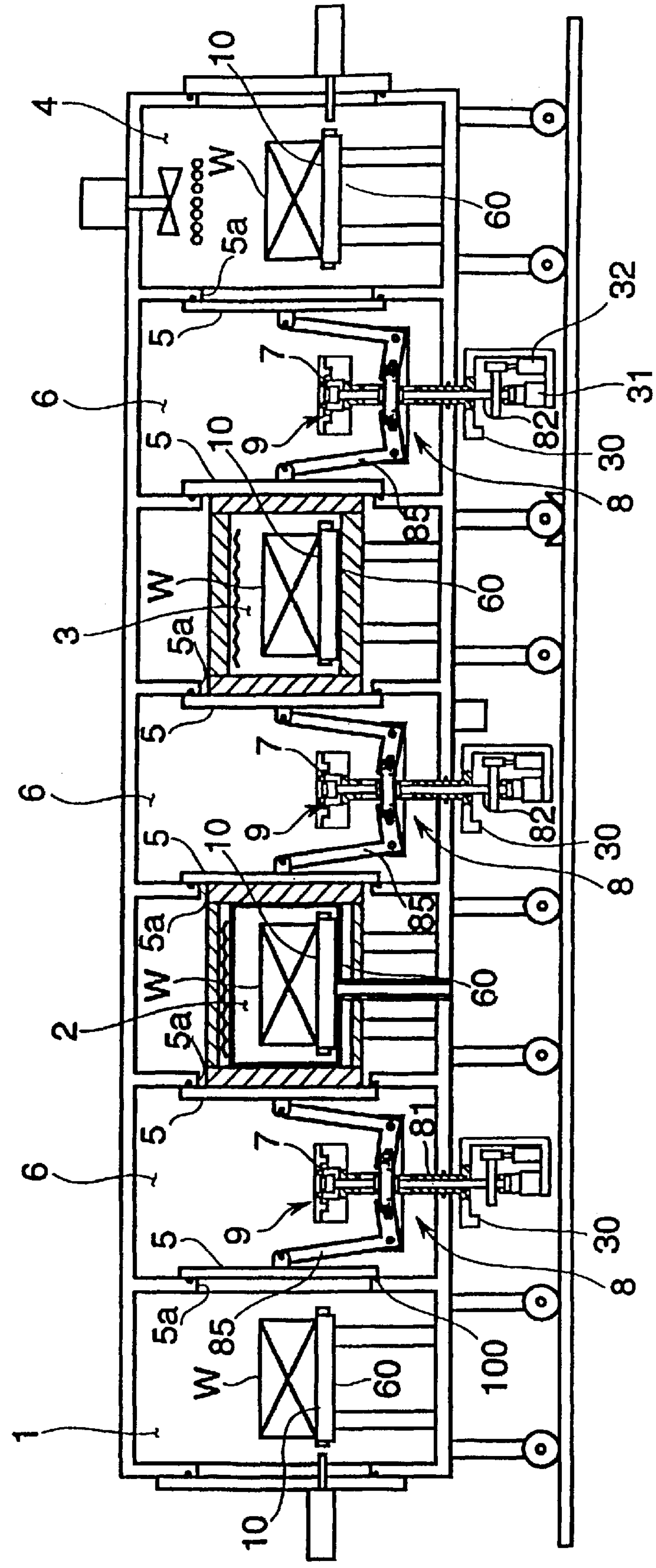
FIG. 1 is a schematic general cross-sectional view showing an embodiment of the present invention.

As shown in FIG. 1, a continuous treatment apparatus, which is used as a so-called continuous dewaxing/sintering furnace, has four treatment chambers that are disposed thus along the path of a treated object w: a preparing chamber 1, a dewaxing chamber 2, a sintering chamber 3, and a cooling chamber 4 in this order from the leading end. A lid 5 is provided at an opening 5*a* that is made as an inlet and outlet of each of the treatment chambers 1 through 4. A separating compartment 6, which is closed by lid 5, is formed between chambers 1 and 2, between chambers 2 and 3, and between chambers 3 and 4.

Figure 3:
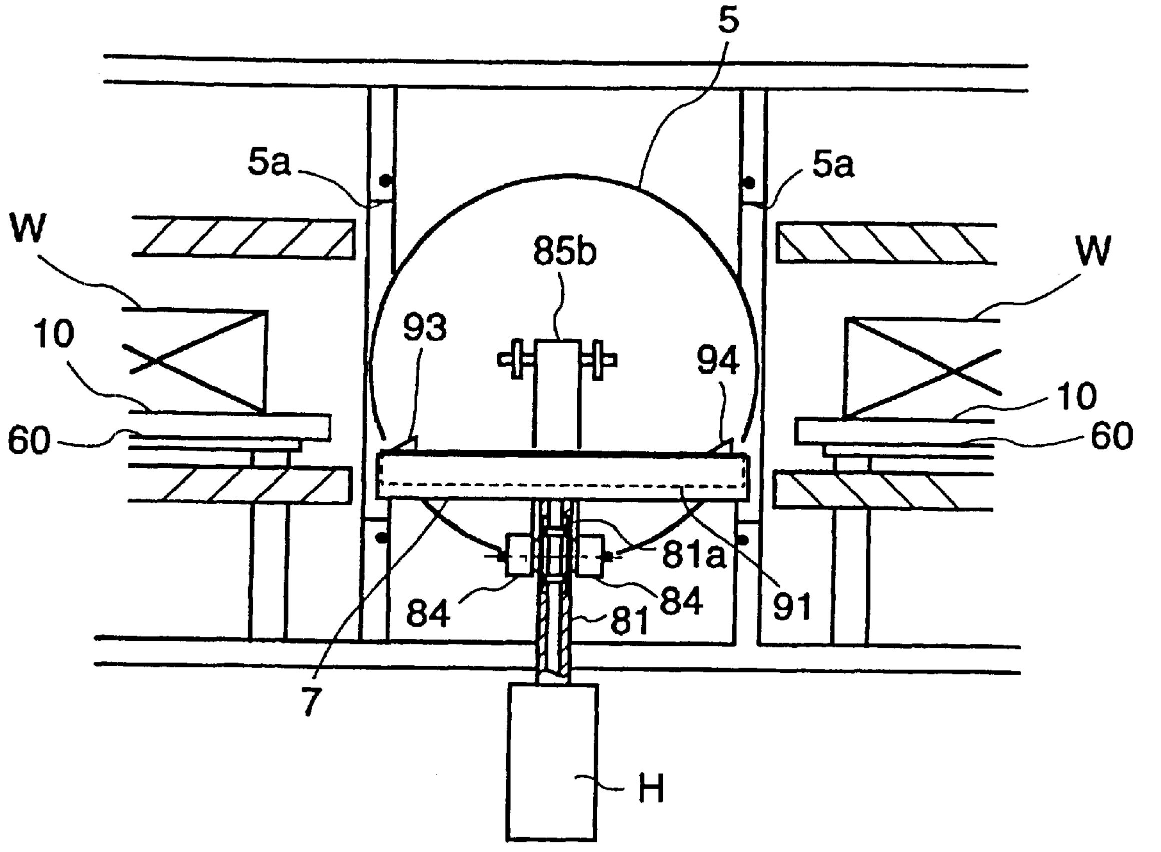
FIG. 3, a counterpart of FIG. 2, illustrates operations.

A transfer rail 7 is provided in separating compartment 6. Using an opening mechanism 8, the transfer rail 7 is driven together with lid 5. As shown in FIG. 3, the lid 5 can be withdrawn so that the lid 5 does not interfere with the transfer rail 7 when it opens. As shown in FIG. 1, the transfer rail 7 can be withdrawn so that the transfer rail 7 does not interfere with the lid 5 when it closes.

Figure 2:
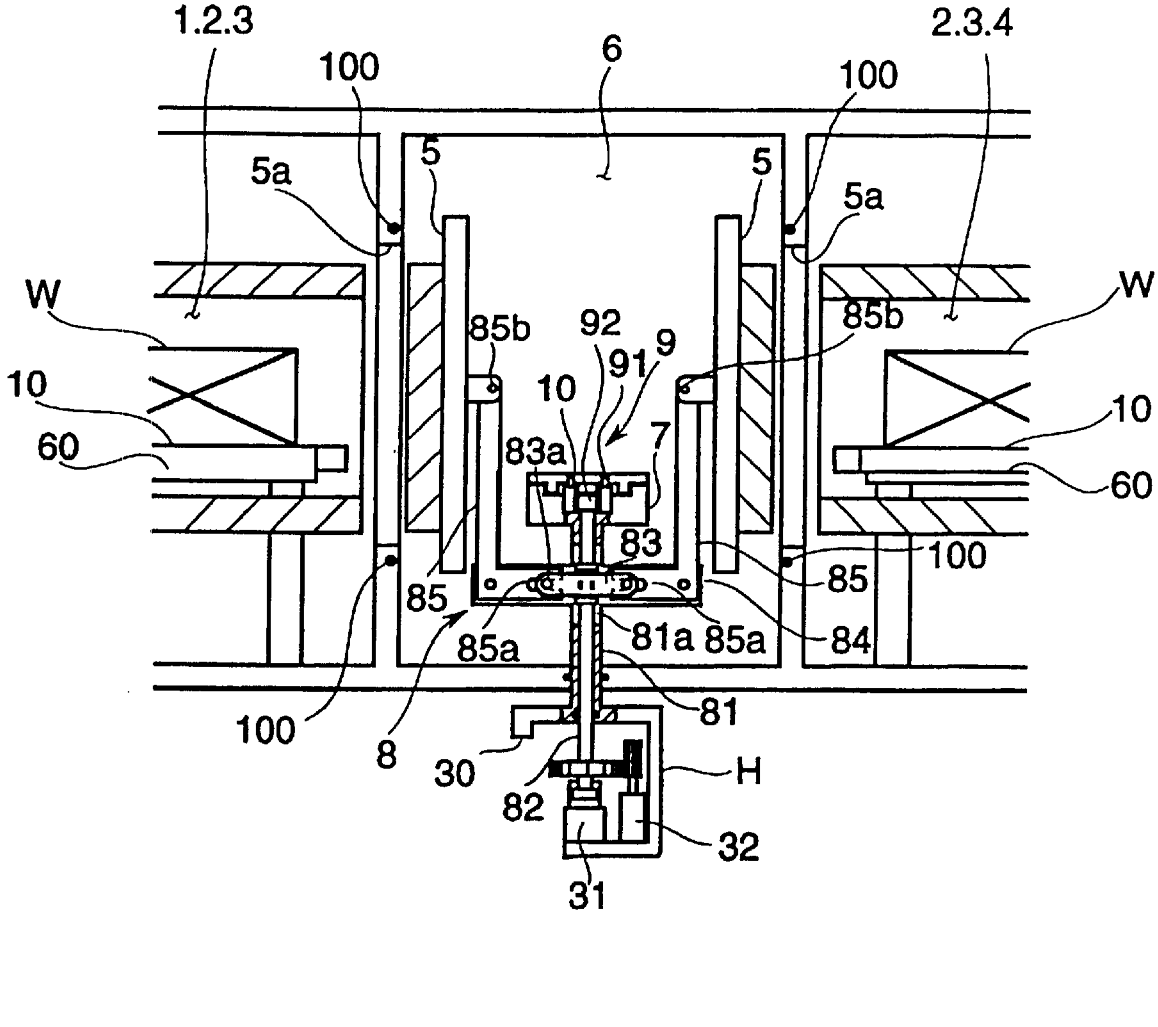
FIG. 2 is a partially enlarged view of the embodiment in FIG. 1.
Figure 4:
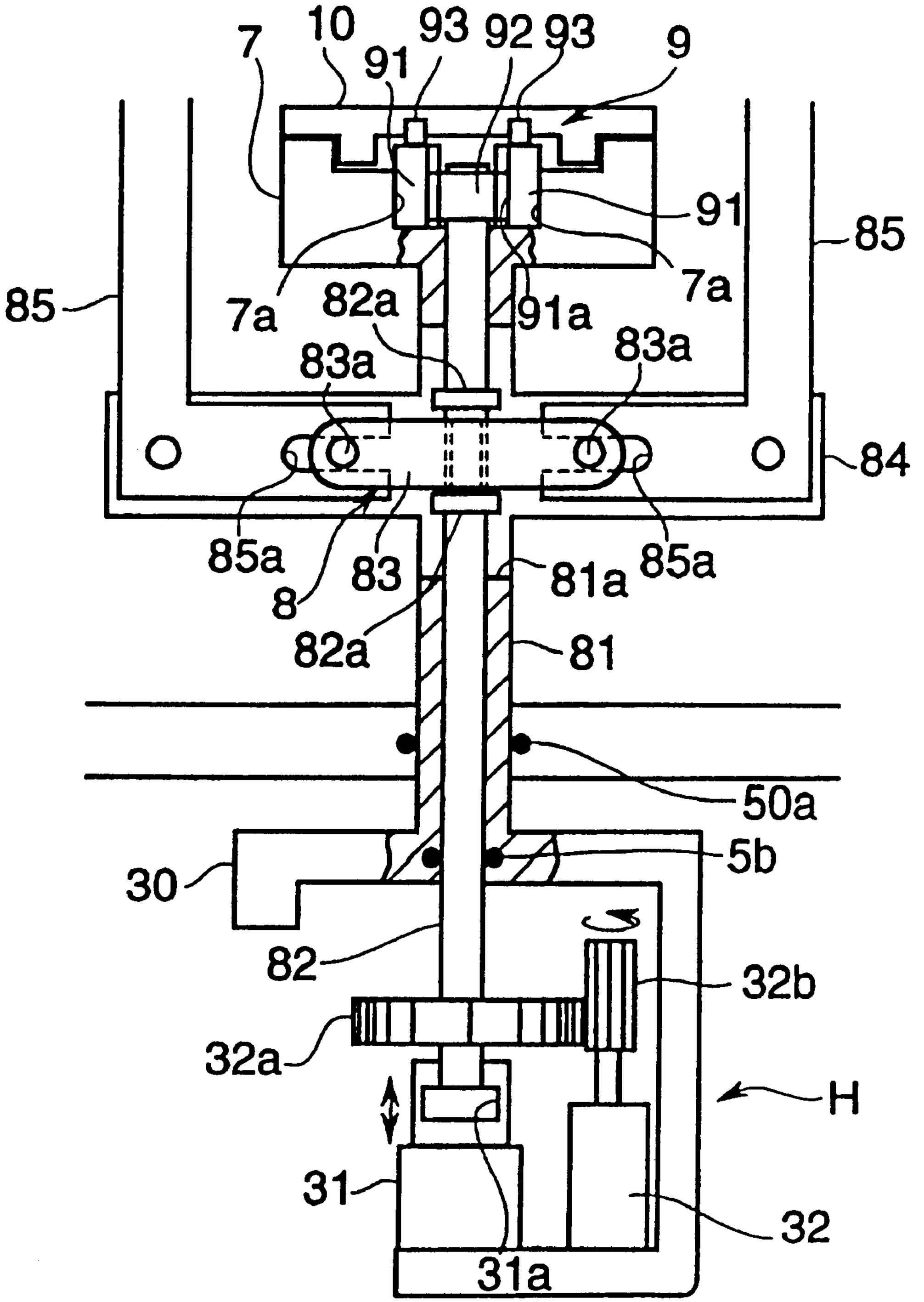
FIG. 4 is a partial enlargement of FIG. 2.

Specifically, the opening mechanism 8 has a hollow rotating shaft 81, a rod 82, a drive link 83, a bracket 84, and an L-shaped link 85, as shown in FIGS. 2 through 4. The rotating shaft 81 has a slit 81*a* in its part and is inserted through the bottom into a separating compartment 6. The rod 82 is housed in the rotating shaft 81 to move up and down, and the end thereof is extended upward through the slit 81*a*. The drive link 83 is supported at the center of the rod 82 to cross the rod and provided at both ends with horizontally protruding pins a 83*a*. The bracket 84, which passes through a slit 81*a*, is installed to horizontally rotate together with the rotating shaft 81. The L-shaped link 85 is pivoted at its center on the bracket 84 and provided at its base end with a groove 85*a* into which the pin 83*a* slides and fits. The transfer rail 7 is secured to the rotating shaft 81. The lid 5 is pivoted at the center of its back at an end 85*b* of the L-shaped link 85. Using a lever 30, the rotating shaft 81 can be rotated. Using a first actuator 31, the rod 82 can be moved up and down. The rod 82 is provided with jaws 82*a* so that they vertically sandwich the drive link 83. The jaws 82*a* lift or lower the drive link 83. The lever 30 is formed at an end of the housing H, which is integrally suspended at the lower end of the rotating shaft 81. The first actuator 31, which is secured to the housing H, lifts or lowers the rod 82 as pivoted on the bearing 31*a* so that the rod can rotate. That is, the opening mechanism 8 can drive the transfer rail 7 and the lid 5 together. For example, as shown in FIG. 2, the mechanism which opens the lid 5 by lowering the rod 82. Then the mechanism operates the lever 30 to rotate the rotating shaft 81 about 90° together with the housing H, withdrawing the lid 5 at right angles to the direction of transfer, as shown in FIG. 3. While withdrawing the lid 5, the mechanism disposes the transfer rail 7 between hearths 60 in the adjacent chambers (1, 2) (2, 3), and (3, 4). Conversely, the mechanism rotates the rotating shaft 81 about 90° in the opposite direction to position the lid 5 so that it faces the opening 5*a* of each of the treatment chambers 1, 2, 3, and 4. At the same time, the mechanism withdraws the transfer rail 7 so that it is at right angles to the direction of transfer. Finally, the rod 82 moves up, thus causing the lid 5 to move until it closes the opening 5*a*, as shown in FIG. 1. In FIG. 2, a reference numeral 100 indicates a seal that makes a pressure-tight contact between a wall in which the opening 5*a* is formed and the lid 5. In FIG. 4, a reference numeral 50*a* indicates a seal that makes a pressure-tight contact between the rotating shaft 81 and the container through which the rotating shaft 81 passes, and a reference numeral 50*b* indicates a seal that makes a pressure-tight contact between the rod 82 and the housing, through which the rod 82 passes.

Figure 5:
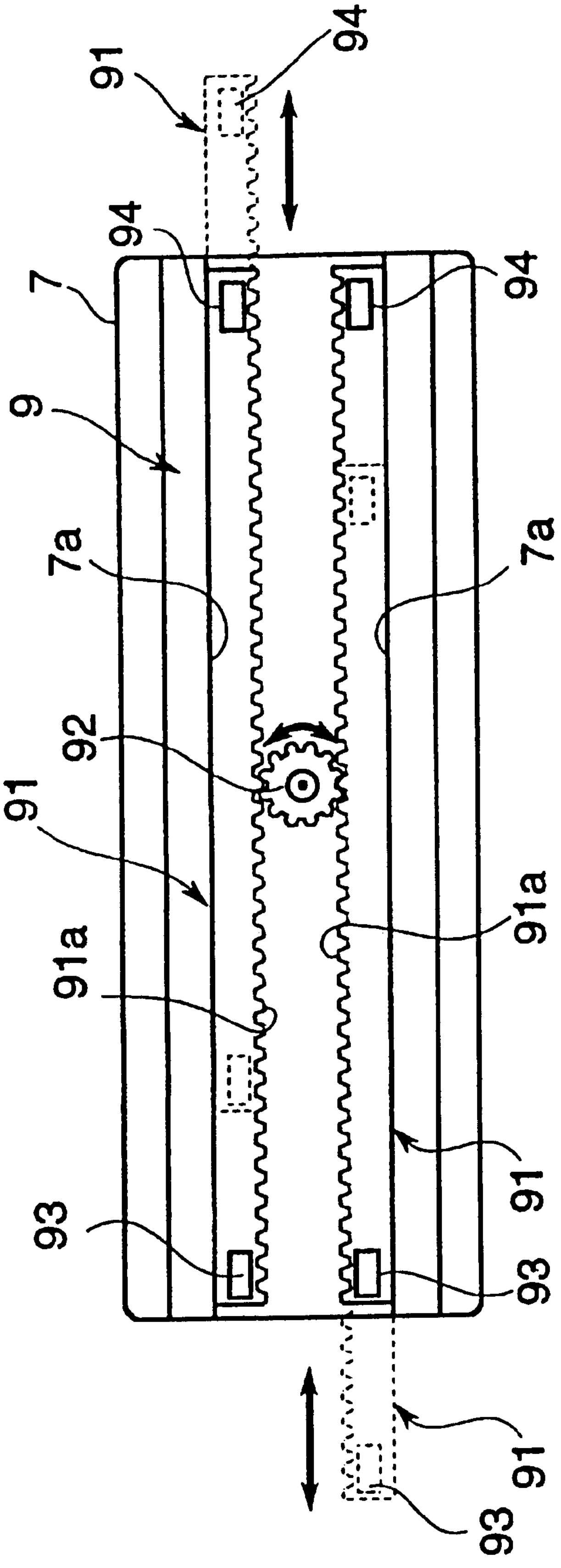
FIG. 5 is a top view, with a rack and its surroundings enlarged.

Using not only such an arrangement as described above but an urging the mechanism 9 in separating the compartment 6, a continuous treatment apparatus according to the present invention transfers treated objects w one after another. As shown in FIGS. 4 and 5, the urging mechanism 9 comprises a pair of rack members 91 that can move in the direction of transfer, a pinion 92 that drives rack members, and latching means 93 and 94 that selectively engages the rack members 91 with a treated object.

The pair of the rack members 91 is disposed, with their lower ends sliding and fitting into a guide groove 7*a* provided in the transfer rail 7. Rack teeth 91*a* are impressed on the opposite surfaces of rack members. The pinion 92, which engages simultaneously with the rack teeth 91*a* on opposite surfaces, is disposed along the middle of the length of the rack members 91. The pinion 92 is coupled with the rod 82, which rotates the pinion. That is, in the housing H, the rod 82 is fit with a gear 32*a*, which is engaged with a drive gear 32*b*. The drive gear 32*b* is driven by a second actuator 32. That is, when the first actuator 31 lifts or lowers the rod 82, the engagement between the gears 32*a* and 32*b* move so that they do not prevent the rod 82 from moving. When the second actuator 32 rotates the rod 82, this rod 82 is rotatably pivoted on the bearing 31*a* so that the rod 82 is not prevented from rotating. When the rod 82 moves up, thus closing the lid 5, the pinion 92 can also move up so long as it does not come off rack teeth 91*a*.

Figure 6:
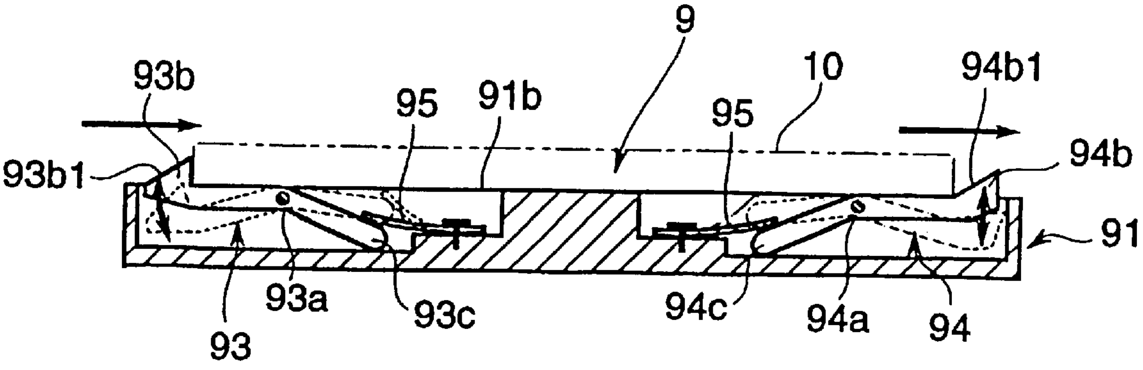
FIG. 6 is a partial cross-sectional view of the embodiment in FIG. 5.
Figure 7:
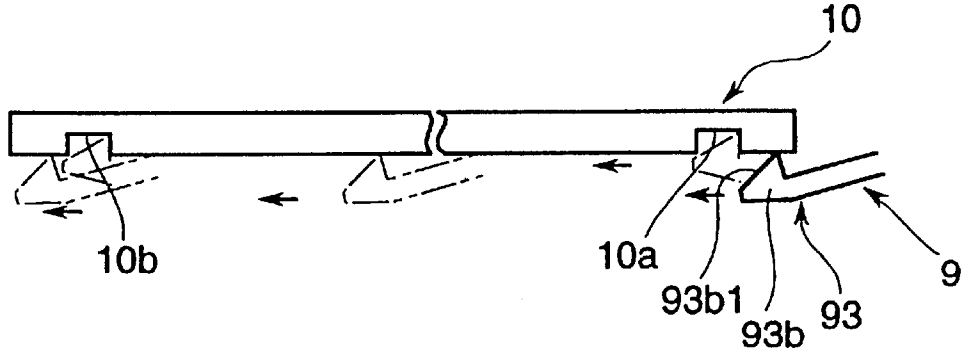
FIG. 7 illustrates operation of the embodiment in FIG. 5.
Figure 8:
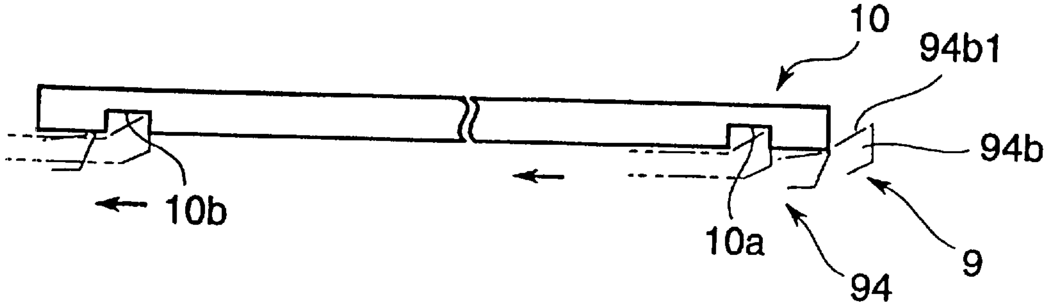
FIG. 8 illustrates operation of the embodiment in FIG. 5.

As shown in FIG. 6, the latching means 93 and 94 is installed in the rack members 91 at their both ends. The means is rotatably attached to the shafts 93*a* and 94*a* that are installed at right angles to the direction of transfer. The means is intended to lift upward hooks 93*b* and 94*b*, which are formed on sides of transfer start and transfer end, above top 91*b* of the rack members 91 or lower the hooks below the top. The hooks 93*b* and 94*b* selectively interpose between a tray 10 on which the treated object is placed and the rack members 91 to indirectly engage the rack members 91 with the treated object. Specifically, the hooks 93*b* and 94*b* have tapered surfaces 93*b*1 and 94*b*1 that progressively become higher from side of transfer start to side of transfer end. As shown in FIGS. 7 and 8, the tapered surfaces 93*b*1 and 94*b*1 are placed under the tray 10 to fit the surfaces into recesses 10*a*, 10*b*, and so on that are provided at the front and rear of the tray 10. As shown in FIG. 6, the inner ends of the rack members 93 and 94 are elastically urged downward by the leaf spring 95. When hooks 93*b* and 94*b* move down, thus lifting inner ends 93*c* and 94*c*, elastic energy is stored in the leaf springs 95.

An application of the embodiment is described below. A sintered object w is assumed to be moved from the sintering chamber 3 to the cooling chamber 4, which is empty as shown in FIG. 1. First, a pressure adjusting means, not shown, is used to level pressure in both the treatment chambers 3 and 4 and separating compartment 6. Then rod 82 is lowered using the first actuator 31, and the lid 5 is opened using the L-shaped link 85 (FIG. 2). Next, the housing H is rotated about 90° to withdraw the lid 5. At the same time, the transfer rail 7 is installed between the treatment chambers 3 and 4 (FIG. 3). Next, using the second actuator 32, the pinion 92 is rotated in a direction to move back the front end of one of the rack members 91, thus placing the ends in the sintering chamber 3, as indicated by a phantom line in FIG. 5. Here, the hook 93*b* of the latching means 93, which is provided at the rear end of the rack member 91, comes under the tray 10 and catches the recess 10*a* at the front end of the rack member 91 (FIG. 7). By reversely operating the second actuator 32, the pinion 92 is driven in the reverse direction to move the tray forward using hook 93*b*. When the tray 10 reaches a proper position, the other rack member 91, in turn, moves back farther than its pair member 91, so that the hook 94*b* of the latching means 94, which is provided at the front end of the other rack member 91, comes under the tray 10 and catches the recess 10*a* at the front end (FIG. 8). Again, by operating the second actuator 32 in reverse, the pinion is driven in the reverse direction, so that the tray 10 is moved farther forward. Here, the hook 94 of the latching means 94, which is provided at the front end of one of the rack members 91, catches the recess 10*b* at the rear end of the tray 10. Again, operating the second actuator 32 in reverse drives the pinion 92 in reverse, moving the tray 10 into cooling chamber 4. Then both the rack members 91 are returned to their original position to close the lid 5.

If the stroke of the rack members 91 is insufficient, increasing the number of recesses in the tray 10 so that the direction of rotation of the pinion 92 is frequently reversed at short time intervals to catch the latching means 93 and 94 can cause the treated object to be transferred in the same manner.

As described above, in the embodiment, the rack members 91 are latched or unlatched by the latching means 93 and reciprocated through the pinion 92 between the treatment chambers 4 and 3, between the treatment chambers 3 and 2, and between the treatment chambers 2 and 1. Thus one treated object w after another can be transferred from the treatment chamber 3 to the treatment chamber 4, from the treatment chamber 2 to the treatment chamber 3, and from the treatment chamber 1 to the treatment chamber 2 without incurring thermal shock to treated objects w.

The urging mechanism 9, which is in the separating compartment 6 between the treatment chambers 4 and 3, between the treatment chambers 3 and 2, and between the treating members 2 and 1, reciprocates the rack members 91 to transfer a treated object w. The rack members 91 and the pinion 92 are mainly in the separating compartment 6, not in the treatment chambers 4, 3, 2, and 1. Thus the rack members 91 and the pinion 92 are less likely to be exposed to hot treatment gases, so that many hours of stable operation can be performed, free of the adverse effects of thermal shock and treatment gas. In particular, the disposition of the actuators 31 and 32 completely outside the container eliminates the above-described potential problems. Urging even a long treated object a plurality of times, with the latching means 93 and 94 engaged with the object at a different position, allows the object to be efficiently transferred without large the rack members 91.

The embodiment uses two rack members 91. While one rack member transfers the tray 10, the other prepares for the next transfer. This allows efficient, high-speed transfer of a treated object w.

In the embodiment, the lid 5 closes the treatment chambers 4, 3, 2, and 1. Again in the embodiment, with the lid 5 open, the transfer rail 7 links the treatment chambers 4 and 3, the treatment chambers 3 and 2, and the treatment chambers 2 and 1, so that the rack members 91 can move along the transfer rail 7. Using such an arrangement, the following two opposite operations are performed around the rotating shaft 81: (1) when the lid 5 is opened, it is withdrawn to a position at which it does not interfere with the transfer rail 7 or the rack members 91; and (2) when the lid 5 is closed, the transfer rail 7 and the rack members 91 are withdrawn to a position at which the transfer rail 7 and the rack members 91 do not interfere with the lid 5. Thus hermetically sealing the treatment chambers 4, 3, 2, and 1 and properly transferring a treated object w are compatible with each other, without interference between mechanisms. This arrangement also allows compact incorporation of the parts. In addition, because the transfer rail 7 is positioned in place or withdrawn by rotation, the gap between the hearths 60 in adjacent treatment chambers can be minimized, resulting in smooth transfer.

The rotating shaft 81 contains rod 82 to open or close the lid 5, withdraw the lid, position the transfer rail in position or withdraw it, drive the urging mechanism 9, and so on. Because the rotating shaft 81 needs to penetrate the container at only one point, an apparatus can be arranged using the least complicated seal mechanisms, etc. Because the opening mechanism 8 for the lid 5 and the rotating shaft 81 support each other in such an apparatus, undue force is prevented from being applied to the container, a component of the apparatus, when the lid 5 closes.

Specific part arrangements are not limited to those described with reference to the embodiment. For example, only one rack member, not two, may be used to transfer a treated object. A lid may be installed at either the outlet or inlet of a treatment chamber. A clutch mechanism may be used to rotate both the pinion and transfer rail. Different shafts may be used for the pinion and transfer rail. To reduce transfer resistance, rollers made of a heat-resistance material, such as graphite, may be installed on the hearth 60 and the tray 10. To protect the seal 100 from exposure to heat when the lid 5 is opened, it is effective to employ an arrangement in which a partially circular heat protecting plate installed on the wall withdraws outside, being pushed by the edge of the lid when the lid closes.

A cooling water path may be located in the rotating shaft 52 to cool the lid 5. In the above-described embodiment, rotating shaft 90° in the reverse direction to reverse the hook of the latching means when the lid opens allows the tray to move opposite to the transfer direction. Therefore, this arrangement is effective for sending a tray in and out when treatment is performed using an apparatus with two treatment chambers.

Other variations can be made without departing from the scope of the present invention. For example, the following variations can be made based on the fact that the urging mechanism used for the above-described embodiment can easily change the orientation of the tray 10 by the rotating shaft 82 when the tray is in the separating compartment 6.

Figure 9:
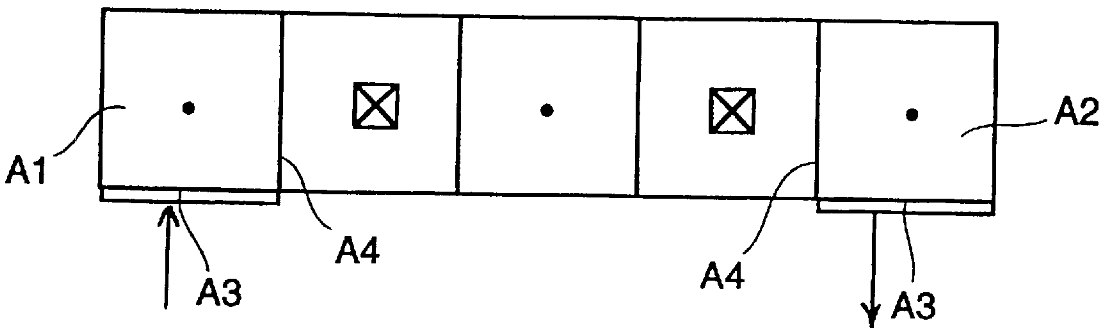
FIG. 9 shows a variation of the present invention.
Figure 10:
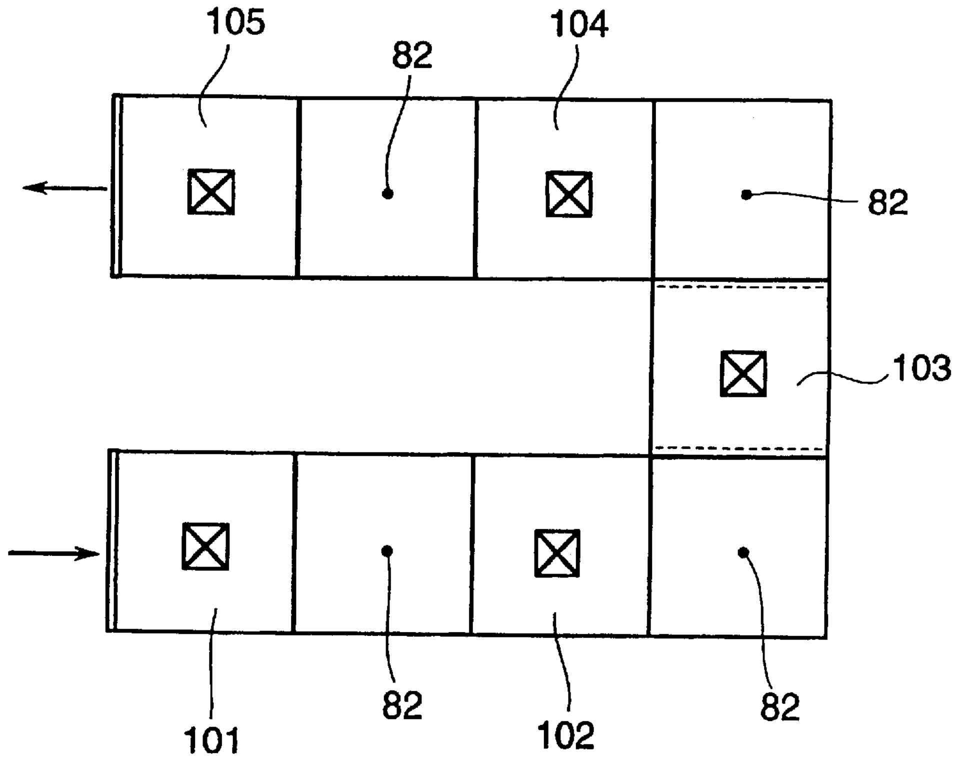
FIG. 10 shows another variation of the present invention.
Figure 11:
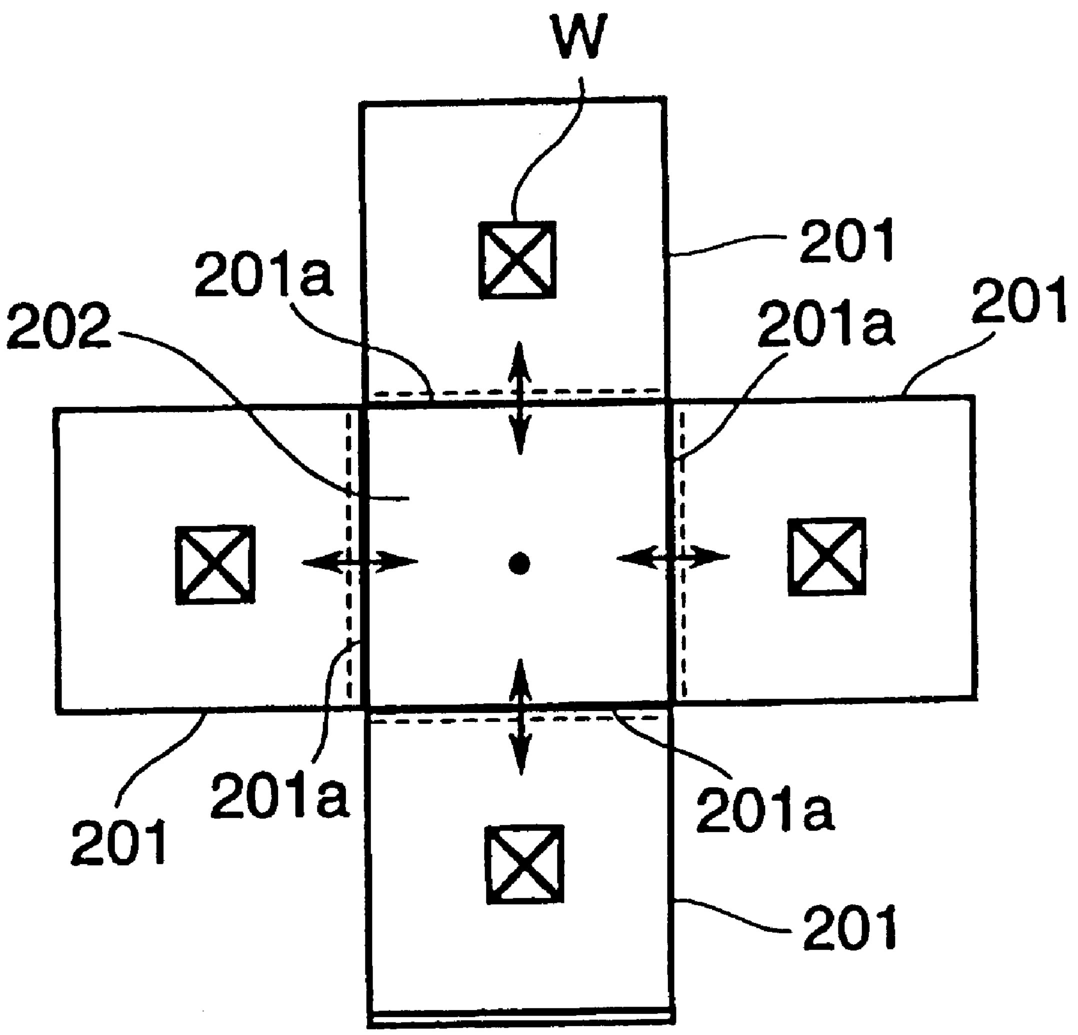
FIG. 11 shows still another variation of the present invention.

For example, the preparation chamber and cooling chamber, which are unlikely be exposed to heat, can be designed as a separating compartment, not a treatment chamber. As shown in FIG. 9, a tray should be moved in and out through an opening A3 on a side of a preparation room A1 or a cooling room A2 and transferred after it is rotated 90°. A hinged door that opens upward or a lid that withdraws upward should be installed at opening A3. A long continuous furnace of a straight-through type that has an increased number of treatment chambers may be bent 90° in the middle or made U-shaped by bending it twice, as shown in FIG. 10, if the furnace requires too much space. In FIG. 10, the treatment chamber consists of a preparation room 101, a first dewaxing chamber 102, a second dewaxing chamber 103, a sintering chamber 104, and a cooling chamber 105. Installing at the bends the transfer rail 7 used for the above-described embodiment, which is driven by the rotating shaft 82, and moving a tray using the urging mechanism 9 attached to the transfer rail 7 allows the tray to continue to be transferred after it is rotated at the bends. A mechanism that withdraws the lid upward may be used at the bends.

A type of continuous treatment furnace has a plurality of treatment chambers 201 with an opening 201*a* facing a central transfer chamber 202. The furnace transfers a treated object w through the central transfer chamber 202 from one treatment chamber 201 to another. To rotate a tray and transfer a treated object w, transfer mechanism 8 and the urging mechanism 9 are effectively used for the transfer chamber 202. Of course, four treatment chambers 201 or more may be provided for one central transfer chamber 202. In such a case, the lids have only to be designed to withdraw upward.

Alternatively, a variation of the means for reciprocating a treated object may be used. The variation has bars with latches disposed on the hearth of the treatment chambers, and these bars can slide back and forth. These bars combine with those in the separating compartments to form one long bar when the racks in the separating compartments are placed in between. The variation is possible to reciprocate all bars simultaneously using linear cylinders provided at the inlet and outlet of the continuous furnace to transfer a treated object forward. Because all bars reciprocate at the same time, all treated objects are also transferred at the same time. Thus the apparatus cannot stand by, with the preceding treatment chamber kept empty. However, the variation may be effective, depending on a treating process or an furnace application.

Because the present invention are arranged as described above, the components of the transfer mechanism are less likely to be exposed to high temperatures, compared with pusher chain type apparatuses. The invention, in which the components can be protected from damage due to thermal shock and treatment gas, also feature extended service lives, eliminating the need for maintenance and reducing operating costs. Reciprocating rack members according to the size of a treated object allows effective transfer even for long objects. Thus the apparatus does not need to be enlarged. This results in lower initial cost and space savings.

An arrangement that allows the lid to be opened or closed and the transfer rail to be moved in and out by rotation about the shafts so that the lid and rail do not interfere with each other reduces the size of the drive mechanism and its peripheral parts, increasing transfer stability and reliability.

What is claimed is:

1. A continuous treatment apparatus adapted so that a treated object can be transferred from a treatment chamber to a next treatment chamber, the treatment apparatus comprising:

urging mechanisms between a plurality of treatment chambers, wherein the urging mechanisms have rack members that can move in the direction of transfer, a pinion which drives the rack members, and a latching means for selectively engaging the rack members with the treated wherein the rack members are reciprocated between adjacent treatment chambers through use of the pinion to transfer the treated object from one treatment chamber to another.

2. A continuous treatment apparatus adapted so that a treated object can be transferred from a treatment chamber to a next treatment chamber, the treatment apparatus comprising:

urging mechanisms between a plurality of treatment chambers, wherein the urging mechanisms have rack members that can move in the direction of transfer, a pinion which drives the rack members, and a latching means for selectively engaging the rack members with the treated object, the rack members are reciprocated between adjacent treatment chambers through use of the pinion to transfer the treated object from one treatment chamber to another, and the rack members are provided in pairs and the pinion is engaged with the rack members at the same time and the following operation is repeated: while one of the rack members moves forward to transfer a treated object, the other moves back in preparation for the next transfer, and vice versa.

3. A continuous treatment apparatus according to claim 2, wherein the latching means is provided at a plurality of positions along the direction of transfer of a treated object by the rack members.

4. A continuous treatment apparatus according to claims 1 or 2, wherein the treated object is disposed on a tray and the latching means is engaged with the tray of the treated object at a plurality of positions along the direction of transfer of the treated object.

5. A continuous treatment apparatus adapted so that a treated object can be transferred from a treatment chamber to a next treatment chamber, the treatment apparatus comprising:

urging mechanisms between a plurality of treatment chambers, wherein the urging mechanisms have rack members that can move in the direction of transfer, a pinion which drives the rack members, and a latching means for selectively engaging the rack members with the treated object, the rack members are reciprocated between adjacent treatment chambers through use of the pinion to transfer the treated object from one treatment chamber to another, and the apparatus is adapted so that each treatment chamber can be opened or closed by a lid, that rack members can move along a transfer rail which links adjacent treatment chambers with the lids open, and that the following opposite operations can be performed around a rotating shaft: (1) when the lid is opened, it is withdrawn to a position at which it does not interfere with the transfer rail or rack members; and (2) when the lid is closed, the transfer rail and rack members are withdrawn to a position at which the transfer rail and rack members do not interfere with the lid.

6. A continuous treatment apparatus according to claim 5, wherein the lid, the transfer rail, and the rack members are installed and withdrawn using a common rotating shaft.

7. A continuous treatment apparatus according to claim 6, wherein a rod is housed in the rotating shaft, and the rod ascends or descends to open or close the lid.

8. A continuous treatment apparatus according to claim 7, wherein the pinion is connected with the rod, and the rod can be rotated without being prevented from ascending and descending.

9. A continuous treatment apparatus according to claim 3, wherein the treated object is disposed on a tray and the latching means is engaged with the tray of the treated object at a plurality of positions along the direction of transfer of the treated object.

10. A continuous treatment apparatus according to claim 1, wherein the latching means is provided at a plurality of positions along the direction of transfer of a treated object by the rack members.

11. A continuous treatment apparatus according to claim 1, wherein the treated object is disposed on a tray and the latching means is engaged with the tray of the treated object at a plurality of positions along the direction of transfer of the treated object.

* * * * *

UNITED STATES PATENT AND TRADEMARK OFFICE

CERTIFICATE OF CORRECTION

PATENT NO. : 6,523,676 B2
DATED : February 25, 2003
INVENTOR(S) : Eiji Nakatsukasa et al.

It is certified that error appears in the above-identified patent and that said Letters Patent is hereby corrected as shown below:

Column 7,
Line 42, insert -- object; and -- after the word "treated".

Signed and Sealed this

Ninth Day of September, 2003

JAMES E. ROGAN
*Director of the United States Patent and Trademark Office*